(No Model.) 4 Sheets—Sheet 1.

F. KOHLER & W. A. CHAMBERS.
MALT DRIER.

No. 362,893. Patented May 10, 1887.

WITNESSES
S. L. Schrader
Gavin Sauter

INVENTOR
Frank Kohler &
Wm. A. Chambers
Paul Bakewell,
att'y.

(No Model.) 4 Sheets—Sheet 2.

F. KOHLER & W. A. CHAMBERS.
MALT DRIER.

No. 362,893. Patented May 10, 1887.

WITNESSES
S. L. Schrader
Edwin Sautter

INVENTOR
Frank Kohler &
Wm. A. Chambers
Paul Bakewell
atty (No Model.) 4 Sheets—Sheet 3.

F. KOHLER & W. A. CHAMBERS.
MALT DRIER.

No. 362,893. Patented May 10, 1887.

WITNESSES
S. L. Schrader.
Eanin Sauter

INVENTOR
Frank Kohler
Wm. A. Chambers
Paul Bakewell, Atty (No Model.) 4 Sheets—Sheet 4.
F. KOHLER & W. A. CHAMBERS.
MALT DRIER.
No. 362,893. Patented May 10, 1887.
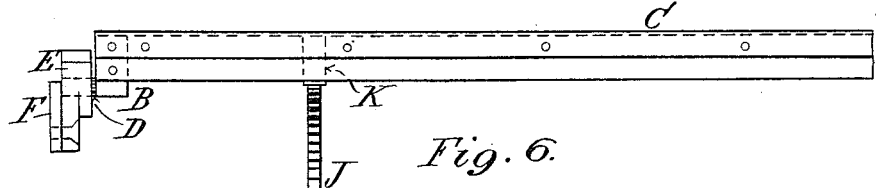
*Fig. 6.*
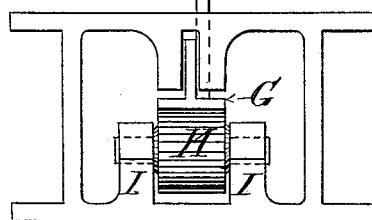
*Fig. 7.*
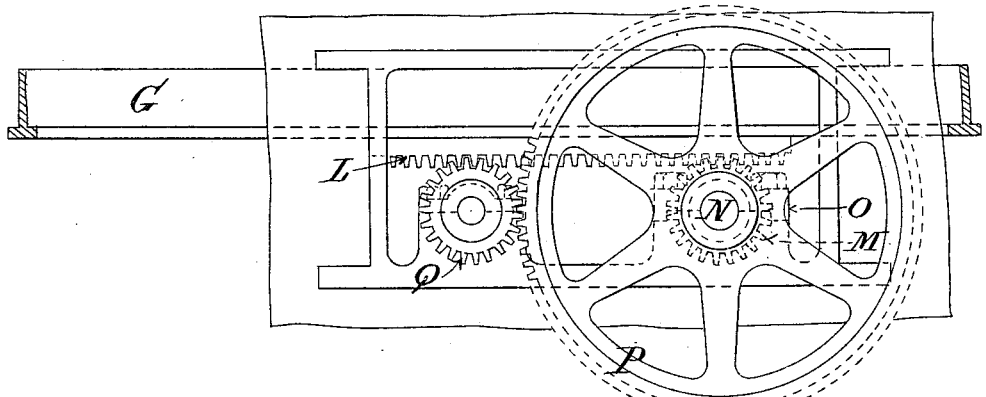
*Fig. 8.*
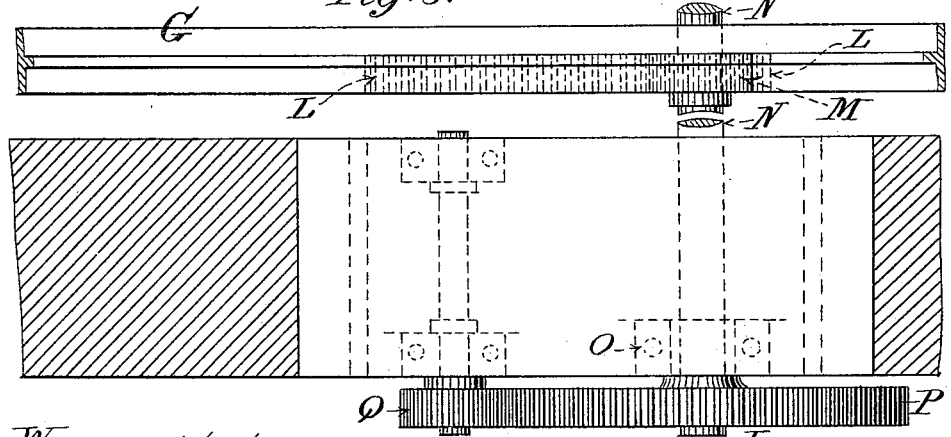
WITNESSES
S. L. Schrader.
Edwin Souter.
INVENTOR
W^m A. Chambers &
Frank Kohler by
Paul Bakewell,
atty.

UNITED STATES PATENT OFFICE.

FRANK KOHLER AND WILLIAM A. CHAMBERS, OF ST. LOUIS, MISSOURI.

MALT-DRIER.

SPECIFICATION forming part of Letters Patent No. 362,893, dated May 10, 1887.

Application filed January 3, 1887. Serial No. 223,214. (No model.)

*To all whom it may concern:*

Be it known that we, FRANK KOHLER and WILLIAM A. CHAMBERS, citizens of the United States, residing at the city of St. Louis, State of Missouri, have invented a certain new and useful Improvement in Kiln Dumping-Floors, of which the following is a full, clear, and exact description.

Our invention relates to an improvement in malt-kiln dumping-floors, and has for its object to enable the floors to be dumped more easily and effectively than can be done with the dumping-floors in present use, and to simplify and cheapen the cost of their construction.

Our invention consists in a floor made in hinged sections, of the form hereinafter described, and which are dumped and raised again to the horizontal position by means of vertical tappet and supporting arms, the said arms being fixed to a longitudinal bar, which bears upon rollers and is moved by suitable means.

Figure 1:
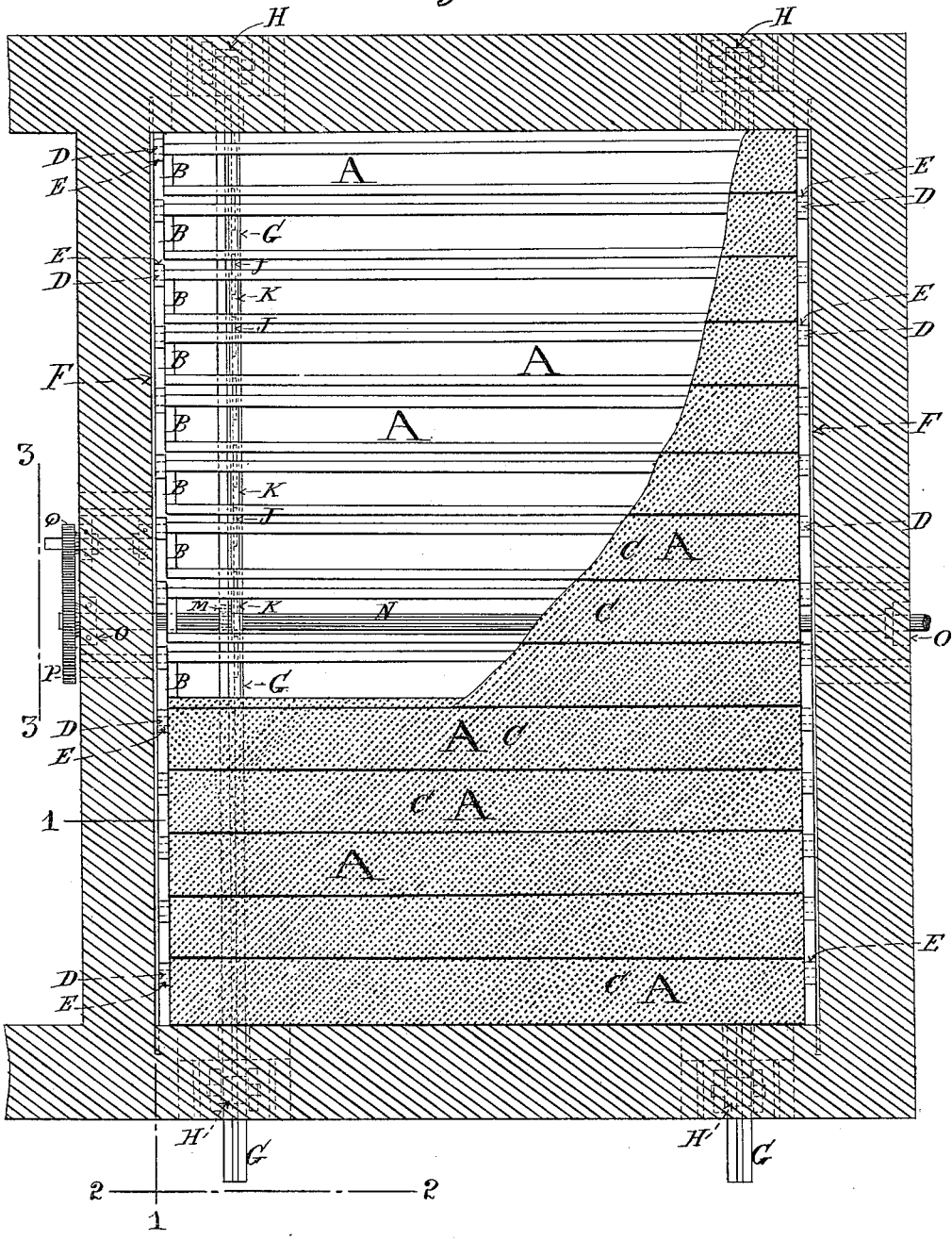
Figure 2:
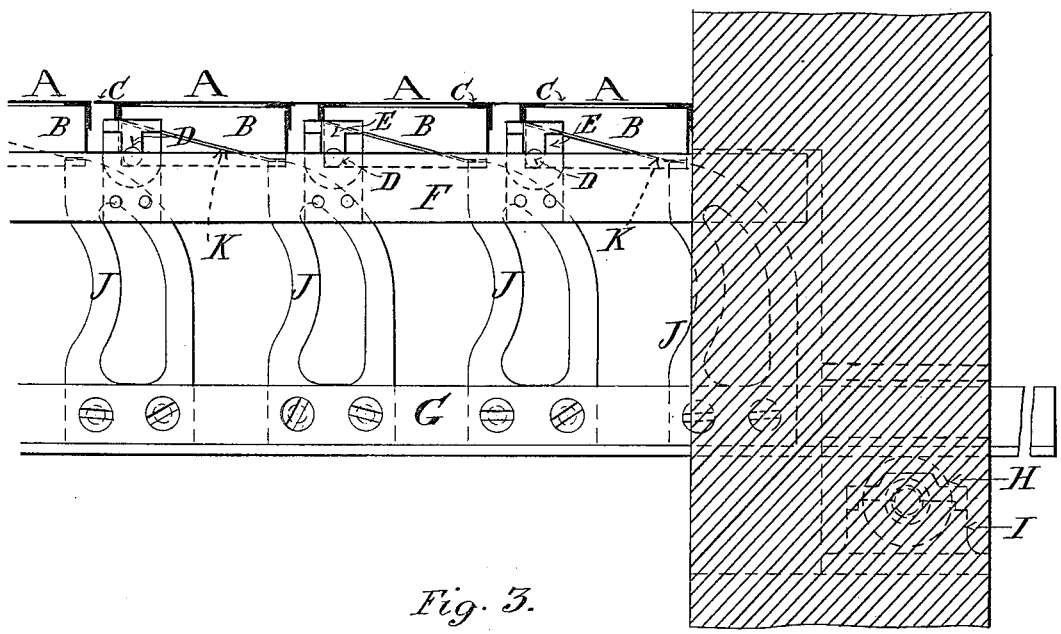
Figure 3:
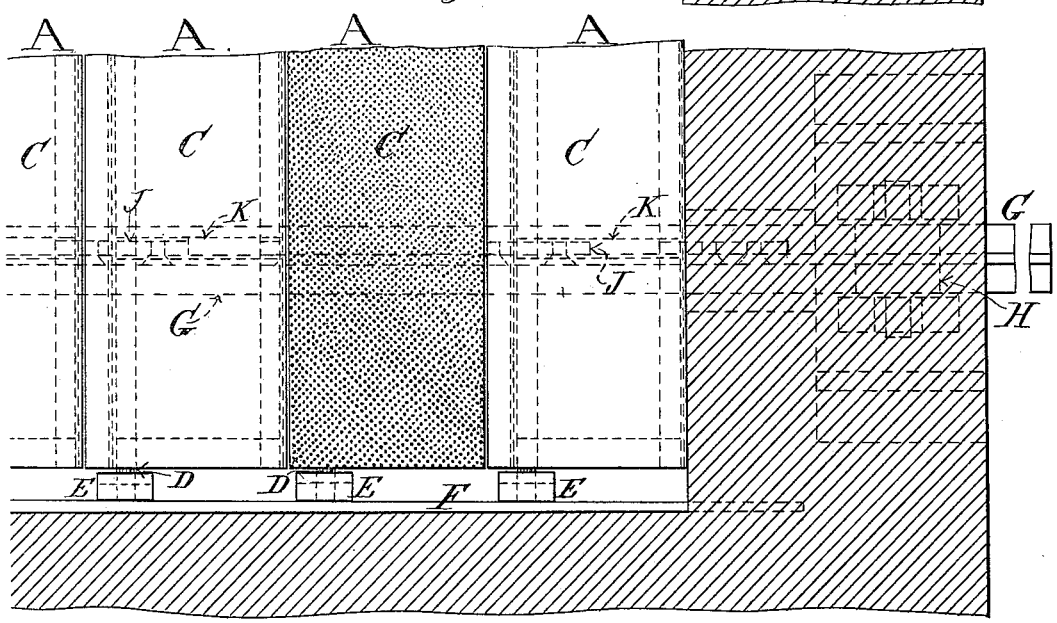
Figure 4:
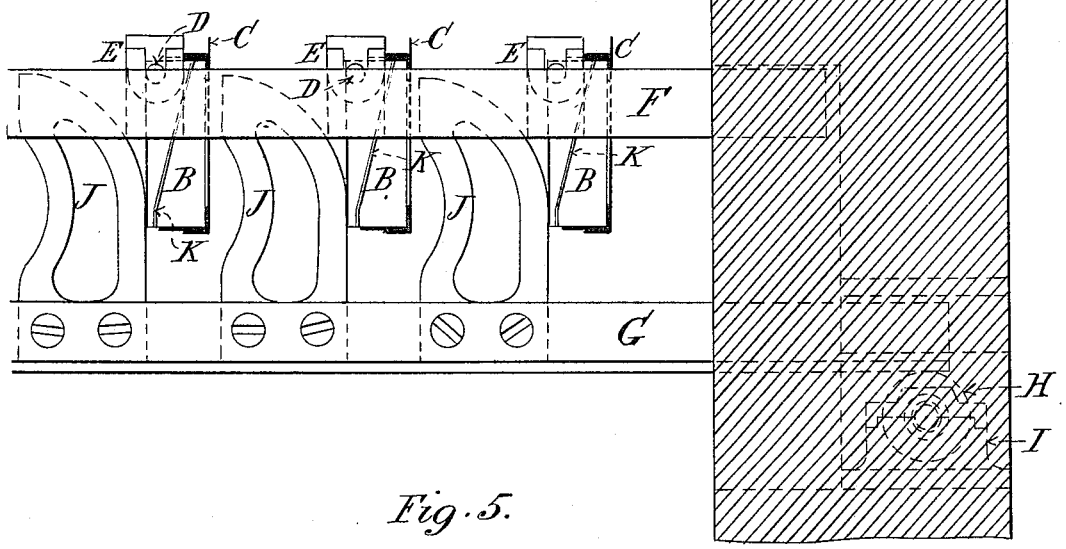
Figure 5:
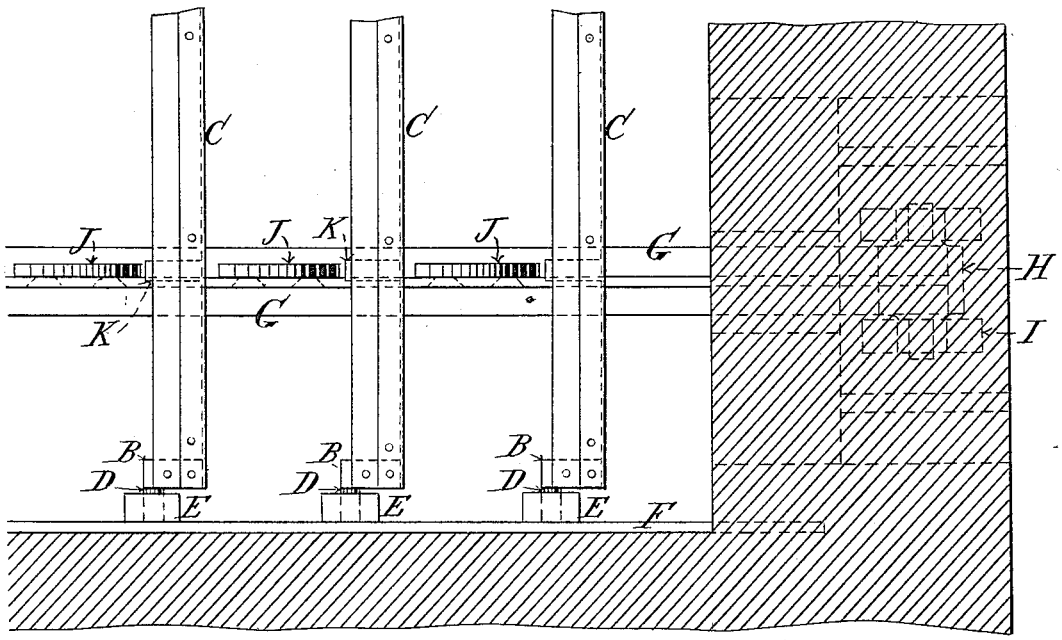

On the accompanying drawings, Figure 1 is a plan representing the general arrangement of our improved malt-kiln dumping-floor, partly broken away; Fig. 2, a side elevation, to an enlarged scale, of a portion of the floor, taken, for example, on line 1 1 in Fig. 1; Fig. 3, a plan of Fig. 2; Fig. 4, a similar view to Fig. 2, showing the floor dumped; Fig. 5, a plan of Fig. 4; Fig. 6, an end view of a portion of the floor, taken on line 2 2 in Fig. 1, with brick-work removed; Fig. 7, a side elevation, to an enlarged scale, of a portion of the floor, taken at line 3 3 in Fig. 1, showing the dumping-gear; and Fig. 8, a plan thereof.

Like letters of reference denote like parts in all the figures.

A A represent the various sections of our improved dumping-floor, which may comprise one, two, or more complete series of sections, A, according to the area or capacity of floor required. Each section A is composed of two end pieces, B, arranged parallel with each other and with the sides of the floor, and connected by bars and angle-irons, so as to form an open rectangular frame-work, which is covered by perforated sheet-iron or wire-cloth, C.

From the outside of each end piece, B, at one of its corners, or, as shown on the drawings, at its extreme left-hand top corner, projects a pivot, pin, or stud, D, whereby each section A is mounted or hinged in bearings E, attached to the two side bars, F, of the floor.

Beneath the sections A, at a suitable distance therefrom and from each other, between the side bars, F, of the floor, are arranged longitudinally and parallel with the floor two or more T-iron or other suitably shaped bars, G, which are guided and supported near their ends on rollers H, mounted in bearings I within the walls of the building. Against the upper webs or sides of the bars G are attached flat or other shaped upright tappet and supporting arms J, which correspond in number and distance apart along the bars G with the number and width, respectively, of the sections A of the floor, and are of such height that the free or unhinged side of each section A, when the floor is horizontal, as shown in Figs. 1, 2, 3, and 6, rests upon a straight flattened portion of the top edges of its corresponding tappet and supporting arms J, the said edges of which curve rearward and downward from these flat portions toward the bars G. Across the frame-work of each section A, where it rests upon the arms J, are fixed bearing and rubbing strips K, which incline inward toward the hinged side and perforated covering C of the section A.

On the under side of each bar G is formed or attached a toothed rack, L, (seen more particularly in Figs. 7 and 8,) into which gears a toothed pinion, M, keyed on a shaft, N, which is arranged beneath the bars G transversely to the floor and mounted in bearings O within the walls of the building. At one end of the shaft N is fixed a spur-wheel, P, which is geared into by a pinion, Q, operated by hand.

Assuming that the dumping-floor is in its normal position, or with the perforated coverings C of its various sections A presenting a continuous horizontal upper surface, as seen in Figs. 1, 2, 3, and 6, and that the free or unhinged side of each section A rests upon its corresponding supporting-arms J, when it is required to dump the floor, the pinion Q and spur-wheel P are rotated, whereby the toothed pinions M are also rotated, and cause the toothed racks L, with the bars G and their tappet and supporting arms J, to slide longitudinally on the rollers H, in the direction indicated by the arrow in Figs. 1, 2, and 3, toward one end of the floor, and in so doing the sections A fall radially on their hinges D until in the position seen in Figs. 4 and 5, when the malt is dumped therefrom onto the floor below. To raise the sections A again to their horizontal position, the pinion Q, spur-wheel P, and pinions M are rotated in the opposite direction, which causes the bars G, with the tappet and supporting arms J, to return to their original position, and in so doing the curved edges of the arms J, striking and bearing against the rubbing-strips K on the bottoms of the sections A, will thereby gradually raise the latter into the horizontal plane.

We claim as our invention—

1. In a malt-kiln dumping-floor, the combination of the sections A, hinged at either corner of their respective ends, and having bearing-strips K, with upright arms J, bars G, and rollers H, substantially as shown, and for the purpose described.

2. In a malt-kiln dumping-floor, the combination of the sections A, hinged at either corner of their respective ends, and having bearing-strips K, with upright arms J, bars G, having toothed racks L, rollers H, toothed pinions M Q, shaft N, and spur-wheel P, substantially as shown, and for the purpose described.

In testimony whereof we have affixed our signatures, in presence of two witnesses, this 24th day of December, 1886.

FRANK KOHLER.
WM. A. CHAMBERS.

Witnesses:
S. L. SCHRADER,
EDWIN SAUTER.